United States Patent
Letson et al.

(10) Patent No.: US 11,068,861 B2
(45) Date of Patent: Jul. 20, 2021

(54) APPARATUS AND METHOD FOR SELF-SERVICE VOUCHER CREATION

(71) Applicant: Walmart Apollo, LLC, Bentonville, AR (US)

(72) Inventors: Eric A. Letson, Bentonville, AR (US); Emily D. McKenzie, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 579 days.

(21) Appl. No.: 15/500,349

(22) PCT Filed: Jul. 30, 2015

(86) PCT No.: PCT/US2015/042845
§ 371 (c)(1),
(2) Date: Jan. 30, 2017

(87) PCT Pub. No.: WO2016/019118
PCT Pub. Date: Feb. 4, 2016

(65) Prior Publication Data
US 2017/0221019 A1 Aug. 3, 2017

Related U.S. Application Data

(60) Provisional application No. 62/031,094, filed on Jul. 30, 2014.

(51) Int. Cl.
*G06Q 30/00* (2012.01)
*G06Q 20/02* (2012.01)
(Continued)

(52) U.S. Cl.
CPC .......... *G06Q 20/02* (2013.01); *G06Q 20/342* (2013.01); *G06Q 20/387* (2013.01); *G06Q 30/02* (2013.01); *G06Q 30/0234* (2013.01)

(58) Field of Classification Search
CPC . G06Q 30/0207; G06Q 20/02; G06Q 30/0234
(Continued)

(56) References Cited

U.S. PATENT DOCUMENTS 7,346,154 B1  3/2008  Andresen
8,011,578 B2  9/2011  Bjoraker
(Continued)

OTHER PUBLICATIONS

Rising Infant Formula Costs to the WIC Program: Recent Trends in Rebates and Wholesale Prices Oliveira, Victor; Frazao, Elizabeth; Smallwood, David M 2016 (Year: 2016).*

(Continued)

*Primary Examiner* — Matthew L Hamilton
(74) *Attorney, Agent, or Firm* — Fitch, Even, Tabin & Flannery LLP (57) ABSTRACT

Systems, apparatuses and methods are provided herein for creating a purchase voucher. In one embodiment, a method of creating a purchase voucher is provided. The method includes the steps of: providing a network accessible user interface for configuring the purchase voucher, receiving a selection of a voucher type through the user interface, receiving a selection of one or more products through the user interface, generating voucher usage parameters based on at least the selection of the voucher type and the selection of the one or more products, associating the voucher usage parameters with a voucher identifier, the voucher identifier being configured to be used by a customer to redeem the purchase voucher with a retailer, and storing the voucher usage parameters and the associated voucher identifier at a networked database.

18 Claims, 8 Drawing Sheets

(51) Int. Cl.
*G06Q 30/02* (2012.01)
*G06Q 20/34* (2012.01)
*G06Q 20/38* (2012.01)

(58) Field of Classification Search
USPC .......................................................... 705/14
See application file for complete search history.

(56) References Cited

U.S. PATENT DOCUMENTS

| | | | | |
|---|---|---|---|---|
| 8,046,266 | B1* | 10/2011 | Geller | G06Q 30/02 705/14.1 |
| 8,190,471 | B2* | 5/2012 | Graves | G06Q 20/10 705/14.1 |
| 8,204,828 | B1 | 6/2012 | Kuite | |
| 8,560,446 | B2 | 10/2013 | Nguyen | |
| 8,676,639 | B2* | 3/2014 | Perlman | G06Q 30/0212 705/14.1 |
| 9,811,833 | B1* | 11/2017 | Garber | G06Q 30/00 |
| 9,811,848 | B2* | 11/2017 | Reuss | G06Q 30/0607 |
| 2001/0042008 | A1* | 11/2001 | Hull | G06Q 30/0211 705/14.13 |
| 2005/0165682 | A1* | 7/2005 | Duke | G06Q 20/04 705/41 |
| 2006/0047569 | A1 | 3/2006 | Sulaiman | |
| 2006/0190332 | A1* | 8/2006 | Grider | B42D 15/045 705/14.27 |
| 2006/0289636 | A1* | 12/2006 | Hoblit | G06Q 20/363 235/383 |
| 2007/0017976 | A1* | 1/2007 | Peyret | G06Q 20/10 235/380 |
| 2007/0108270 | A1* | 5/2007 | Bjoraker | G06Q 20/10 235/380 |
| 2007/0119921 | A1* | 5/2007 | Hogg | G06Q 20/04 235/380 |
| 2007/0158413 | A1 | 7/2007 | Hastie | |
| 2008/0048023 | A1 | 2/2008 | Russell | |
| 2008/0208747 | A1* | 8/2008 | Papismedov | G06Q 20/20 705/44 |
| 2009/0171804 | A1* | 7/2009 | Lee | G06Q 30/02 705/26.1 |
| 2010/0100238 | A1 | 4/2010 | Torian | |
| 2010/0145810 | A1 | 6/2010 | Pourfallah | |
| 2010/0318415 | A1 | 12/2010 | Gottlieb | |
| 2011/0015976 | A1 | 1/2011 | Lempel | |
| 2011/0099104 | A1* | 4/2011 | Nybom | G06Q 20/06 705/41 |
| 2012/0016738 | A1* | 1/2012 | Ouimet | G06Q 30/02 705/14.46 |
| 2012/0271757 | A9 | 10/2012 | Shakkarwar | |
| 2013/0103487 | A1* | 4/2013 | Nordstrand | G06Q 20/387 705/14.38 |
| 2013/0191280 | A1* | 7/2013 | Simonian | G06Q 20/354 705/41 |
| 2013/0297431 | A1* | 11/2013 | Deubell | G06Q 20/18 705/17 |
| 2013/0339167 | A1* | 12/2013 | Taylor | G06Q 20/387 705/21 |
| 2014/0095386 | A1* | 4/2014 | Marshall | G06Q 20/405 705/44 |
| 2014/0310084 | A1* | 10/2014 | Marshall | G06Q 30/0226 705/14.27 |
| 2016/0005028 | A1* | 1/2016 | Mayblum | G06Q 20/342 705/26.81 |
| 2017/0286991 | A1* | 10/2017 | Chakrobartty | G06Q 20/20 |
| 2018/0322523 | A1* | 11/2018 | Letson | G06Q 30/0238 |

OTHER PUBLICATIONS

PCT; App. No. PCT/US2015/042845; International Search Report and Written Opinion dated Jan. 7, 2016.
IMPI; App. No. MX/a/2017/001327, Office Action dated Apr. 6, 2021.

* cited by examiner

APPARATUS AND METHOD FOR SELF-SERVICE VOUCHER CREATION

RELATED APPLICATIONS

This application is filed in accordance with 35 U.S.C. 371 claiming priority to International Application No. 2015/042,845, with international filing date of Jul. 30, 2015, which claims the benefit of U.S. Provisional Application Ser. No. 62/031,094, filed Jul. 30, 2014, all of which are incorporated by reference in their entirety herein.

TECHNICAL FIELD

This invention relates generally purchase substantiation and purchase vouchers.

BACKGROUND

Purchase substantiation generally refers to a purchase made by a customer and fully or partially paid for by a third party. For example, a provider may wish to provider a gift card or other forms of redemption voucher to a consumer to purchase certain products. Individuals or entities wishing to provide purchase substantiation generally must contact a retail store to setup such programs. The setup process could be tedious for the retailer and often require multiple meetings between the provider and the retailer. The man-hours required to setup substantiation programs adds to the operating cost of the retailer and makes such program less cost effective for both parties.

BRIEF DESCRIPTION OF THE DRAWINGS

Disclosed herein are embodiments of apparatuses and methods for a user interface for self-service purchase voucher creation. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for self-service voucher creation. A method of creating a purchase voucher includes providing a network accessible user interface for configuring the purchase voucher. A selection of a voucher type and a selection of one or more products are received through the user interface. A system then generates voucher usage parameters based on at least the selection of the voucher type and the selection of the one or more products. The systems associates the voucher usage parameters with a voucher identifier, the voucher identifier being configured to be used by a customer to redeem the purchase voucher with a retailer, and stores the voucher usage parameters and the associated voucher identifier at a networked database.

Figure 1:
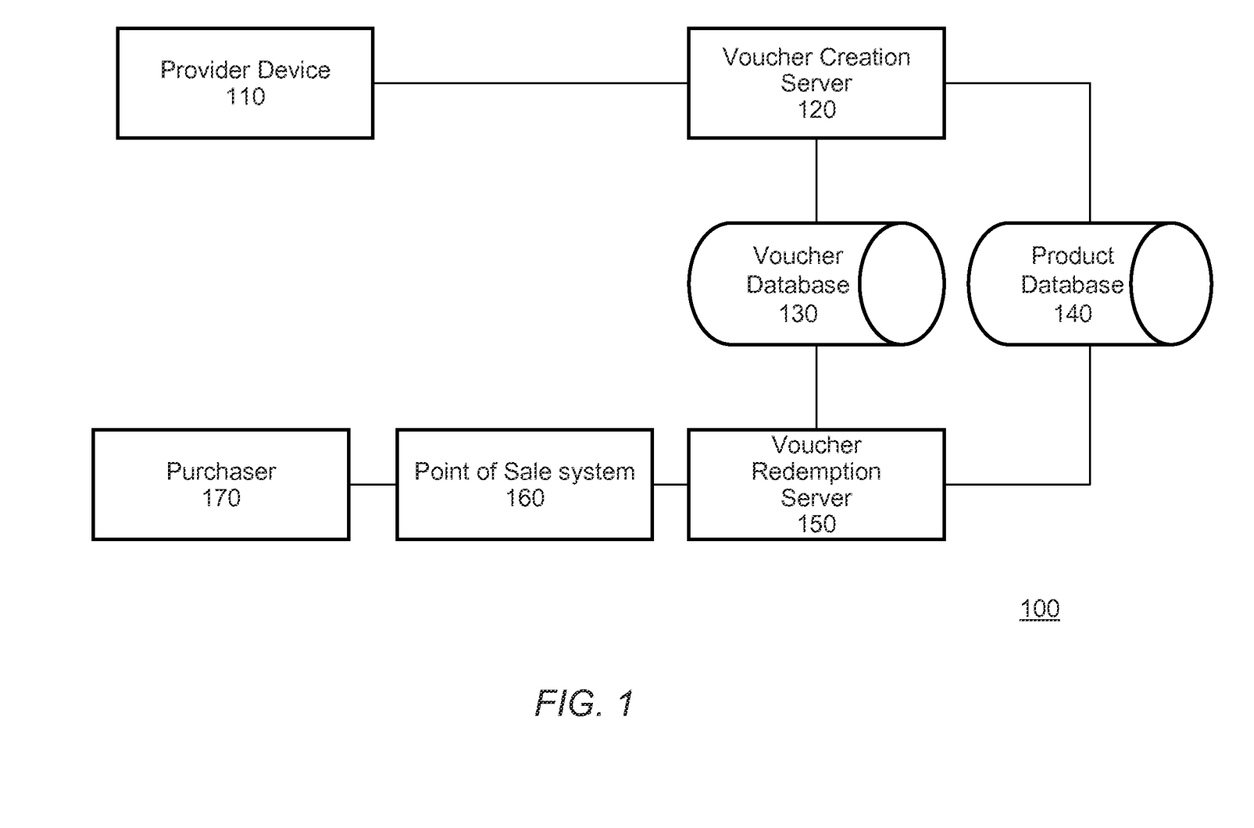
FIG. 1 is a block diagram of a system in accordance with several embodiments.

Referring now to FIG. 1, a system for self-service voucher creation is shown. The system 100 includes a provider device 110, a voucher creation server 120, a voucher database 130, a product database 140, a voucher redemption server 150, a point of sale system 160, and a purchaser 170. While the voucher creation server 120, the voucher database 130, the product database 140, the voucher redemption server 150, and the point of sale (POS) system 160, are shown as separate elements in FIG. 1, one or more of these elements may be implemented by the same one or more physical devices. For example, the provider device 110 may access the same server or group of servers that provides voucher usage information to the point of sale system 160 to create a voucher. The voucher database 130 and the product database 140 may present multiple databases implemented on one or more devices. Additional databases and/or servers useful in implementing the voucher creating system may also be present in the system. For example, the system may further include a provider profile and payment information database.

The provider device 110 may be any processor based device that can access the voucher creation server 120. The provider device 110 may include a storage memory and one or more input and output devices such as a keyboard, touch screen, and a monitor.

The voucher creation server 120 provides an interface for self-service voucher creation to the provider device. The self-service voucher creation user interface may be a downloaded application, a cloud-based application, and/or a website. The voucher creation server 120 may generally be any processor based server device. The voucher creation server 120 communicates with at least the voucher database 130 and product database 140 to provide information to the self-service voucher creation user interface on the provider device 110 and store voucher information for vouchers created with the voucher creation interface. Further details of the voucher creation user interface and voucher creation process are provided herein with reference to FIGS. 2-7 below.

The voucher database 130 and the product database 140 may be any network accessible memory storage. The voucher database 130 may store voucher information for voucher groups and individual vouchers, including voucher type and voucher usage parameters for each voucher as configured by the voucher creation interface. Voucher usage parameters may specify products that are included or excluded from the usage of the voucher. In some embodiments, the voucher database 130 or a separate provider database stores provider information such as provider log-in credentials, payment information, and settings. The voucher database 130 may further store voucher post-usage information. For example, the voucher database 130 may store a balanced and/or redemption status of one or more vouchers.

The product database 140 may store information on products that may be purchased at the point of sale system 160. Products may include physical items, gift cards, and/or services, etc. The product database 140 may store information on one or more of product category, product type, manufacturer, nutritional value, maturity rating, and price etc. The products may be grouped by one of more of its attributes. Each group may also contain one or more levels of subgroups. In some embodiments, the product database 140 also stores product group specified by retailers, manufacturer, and/or users. For example, the product database 140 may store a list of items selected by a user through the self-service voucher creation interface and make that list available for selection by other users creating their own vouchers. The product database 140 provides product information to the voucher creation interface such that a user can browse and/or search through products, product groups, and/or product sub-groups to generate a list of authorized or unauthorized products for the voucher being created.

The purchaser 170 generally refers to any person or entity seeking to redeem a voucher at a point of sale. The purchaser may be a recipient of a gift card, a coupon, a rebate offer, a government assistance program, and the like. The point of sale system 160 may be an in-store checkout terminal or an online checkout system. For an in-store checkout terminal, the purchaser may bring a physical redemption voucher into the store. A physical voucher may be printed sheet having a bar code and/or a voucher code. A physical voucher may be a card with a magnetic strip. In some embodiments, the point of sale system 160 may accept a voucher identifier shown on a mobile device. An in-store point of sale system 160 may include a scanner, a card reader, a keypad etc. for entering the voucher identifier. For an online point of sale, a customer may enter a voucher code and/or pin code, or click through a link provided with the voucher to apply the voucher to an online purchase. One or more items may also be scanned or added to a virtual shopping cart at the point of sale. The point of sale system 160 may forward the voucher identifier to the voucher redemption server 150 to determine the voucher usage parameter associated with a received voucher identifier.

The voucher redemption server 150 facilitates the redemption of a purchase voucher based on the information stored on the voucher database. The voucher redemption server 150 may retrieve information associated with a voucher identifier and calculate an amount due by the purchaser based on the usage parameters and items for purchase. For example, the voucher redemption server 150 may first determine which type of voucher is being applied and compare a list of items scanned at the point of system 160 against the list of authorized products identified in the usage parameters of the voucher. For each product redeemable by the voucher, the server may determine the amount of substantiation to apply. The server may then calculate the portion of the cost not covered by the voucher as the total amount due by the purchaser. In some embodiments, the server also calculates the amount due by the provider of the voucher. In some embodiments, at the completion of purchase, the voucher redemption server 150 may update the voucher usage information and/or redemption status at the voucher database 130.

Figure 2:
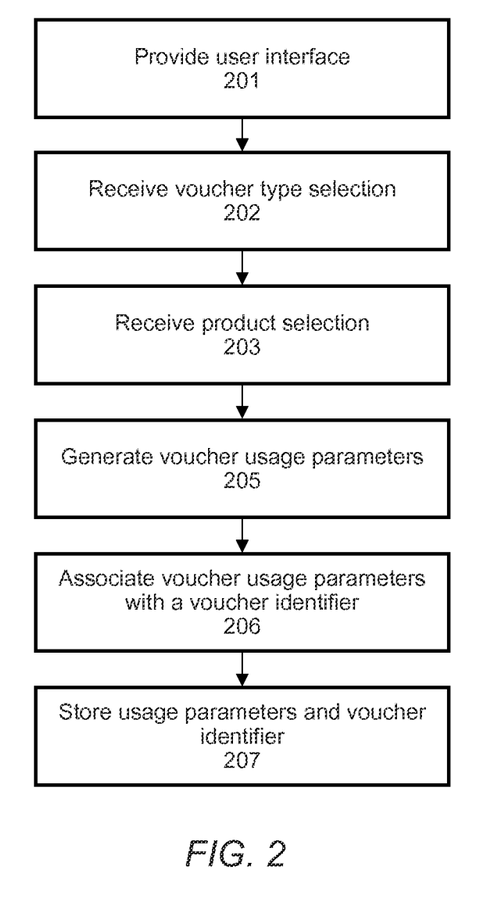
FIG. 2 is a flow diagram of a method in accordance with several embodiments.

Referring now to FIG. 2, a flow diagram of a method for creating a voucher is shown. In step 201, a self-service voucher creation user interface is provided. The self-service voucher creation interface may be provided to a voucher provider via a downloaded application, a cloud-based application and/or a website. In step 202, a voucher type selection is received via the user interface. Voucher types may include, but is not limited to, gift cards, percentage discount coupons, monetary amount discount coupons, rebate coupons, and royalty programs. A gift card may be a card with a momentary amount that a consumer can spend on authorized products. For example, a customer may apply the balance on a gift card toward the total purchase cost of a shopping trip. In some embodiments, a gift card may be linked to a provider billing account or replenishable account. In some embodiments, the provider may pre-load the gift card with a fixed amount for one time use. In some embodiments, the provider may pay for the balance on the gift card after it has been redeemed. In some embodiments, the gift card may be replenished on a periodic basis by the provider. A percentage discount coupon provides a percentage discount on certain products. For example, a voucher may provide a 30% discount on all baby products. The cost of the discount amount may be paid for entirely by the provider or shared with the retailer or a third party. A monetary amount discount coupon provides a fixed dollar amount towards individual products or the entire purchase. For example, a voucher may provide a $1 discount on all products of a specific brand. A rebate coupon provides a rebate to the customer after the customer pays for the purchase. For example, a voucher may offer a $50 dollar rebate on energy saving appliances. The customer would pay for the full cost of the appliance at purchase. When the voucher is redeemed, the retailer would either notify the provider to provide the rebate or may be authorized to provide the rebate to the customer at the point of sale. Rebate may be provided in the form of a check or a gift card. In some embodiments, rebate is provided by adding a balance to the rebate voucher such that the rebate voucher becomes redeemable for further purchases of other products. A royalty program voucher may accumulate points each time the voucher is used for purchase. Points may be added based on item count or monetary amount spent. An item, a monetary amount, or a discount amount may be added to the voucher for redemption when a certain number of points have been accumulated. Generally, a voucher can be used for any program in which a provider substantiates at least partially the purchase of goods and/or services by a consumer. The substantiation may be in the form of a payment to the retailer or other forms of compensation agreement with the retailer.

The interface may provide a list of voucher types for a user to select. In some embodiments, some voucher types may be further configured with additional options. For example, a user may set the dollar amount to load on a gift card. In another example, a user may set a percentage or monetary amount for a discount coupon. In some embodiments, different discount amount may be set for different products in one voucher. In another example, rebate amount and form of rebate payment may be configured. In yet another example, how rewards are earned may be specified for royalty programs. In some embodiments, the user can further configure how they would like to pay for the voucher. For example, the user may choose to pre-pay for the cost of the vouchers or be billed after vouchers are redeemed.

In step 203, selection of one or more products is received. A provider may wish to include or exclude certain products that are redeemable with their voucher. For example, a government assistance program may wish to exclude alcohol and high price electronics from being purchased with their vouchers. In another example, a parent may wish to send their child on a shopping trip with a gift card that can only buy back-to-school items. In yet another example, a friend may wish to give a gift card to a new mother that can only be used to purchase baby care related products. When a user sets up a voucher, he/she can select one or more products to either include or exclude from the usage of the created voucher. If the user chooses set to inclusion rules, the voucher will only be authorized to be applied to the included product. If the user chooses to set exclusion rules, the voucher can be used to purchase any non-excluded product.

In some embodiments, the user interface provides listings of individual products and/or product groups to the user through the voucher creation user interface for selection. In some embodiments, individual items may be added or restricted based on their product category (yogurt, chips, pen, diaper, etc.), department (produce, household supplies, snacks, etc.), manufacturer or brand (Sam's Choice, Equate, etc.), nutritional value (calories per serving, iron content, etc.), and/or maturity rating (E or M for games, PG or R for movies, etc.). Each of the product groupings may further include one or more levels of sub-groupings. In some embodiments, products lists created in step 203 may be shared among users. For example, after a user creates a list of products appropriate for new mothers, another user may copy the same list for their voucher. In some embodiments, the user interface may provide suggested product categories for the user to choose from. For example, the system may provide a suggested list of products for vouchers for new mothers, for back-to-school students, for new graduates, etc. In some embodiments, users can further edit a list copied over from another user's account and/or suggested by the system.

In step 205, voucher usage parameters are generated based on the voucher type selected in step 202 and the products selected in step 203. In step 206, one or more voucher identifiers are associated with the usage parameters. In some embodiments, the user can choose to generate one or more vouchers with the usage parameters configured in steps 202-205. In some embodiments, each voucher has a unique identifier and is only intended to be used by a single customer. In some embodiments, each voucher identifier can only be redeemed once. In some embodiments, a voucher identifier can be used as long as there is a positive balance on the voucher or before an expiration date. In some embodiments, a voucher identifier may be generated for distribution to multiple customers. For example, a voucher can be a coupon code for certain products that any customer can use.

In step 207, the usage parameter and voucher identifier(s) are stored. The voucher identifier(s) and usage parameters may be stored on a database accessible from point of sale to facilitate the redemption of vouchers. The stored usage parameters generally provide usage rules for vouchers. The database may further store voucher redemption status information and/or voucher balance information for each voucher identifier in the system.

In some embodiments, before step 207, the user interface also provides a customization interface for the user to customize the appearance of the voucher. A user may choose stock images or upload one or more images to customize a voucher. A user may also input text for vouchers that may include instructions and disclaimers etc. In some embodiments, the user may also select whether the voucher should be a digital voucher or a physical voucher. Physical vouchers may be, for example, a printed coupon or a gift card with a magnetic strip. A digital voucher may be provided in the form an email, an image, a link, etc. In some embodiments, the system emails, or otherwise electronically transmits, digital vouchers to recipients of the voucher.

In some embodiments, the voucher creation interface also maintains profiles for voucher providers. A provider may have a login credential that allows them to access voucher usage reports after vouchers are created. Providers may also access configurations for previously created vouchers to generate additional vouchers based on the same settings. In some embodiments, the user interface also includes a payment system for the vouchers. For example, if a user creates a gift card type voucher, he/she can pre-load the gift card through the user interface. In another example, a provider may associate a billing account to a group of vouchers. The provider will then be billed or charged when their vouchers are redeemed by a purchaser.

Figure 3:
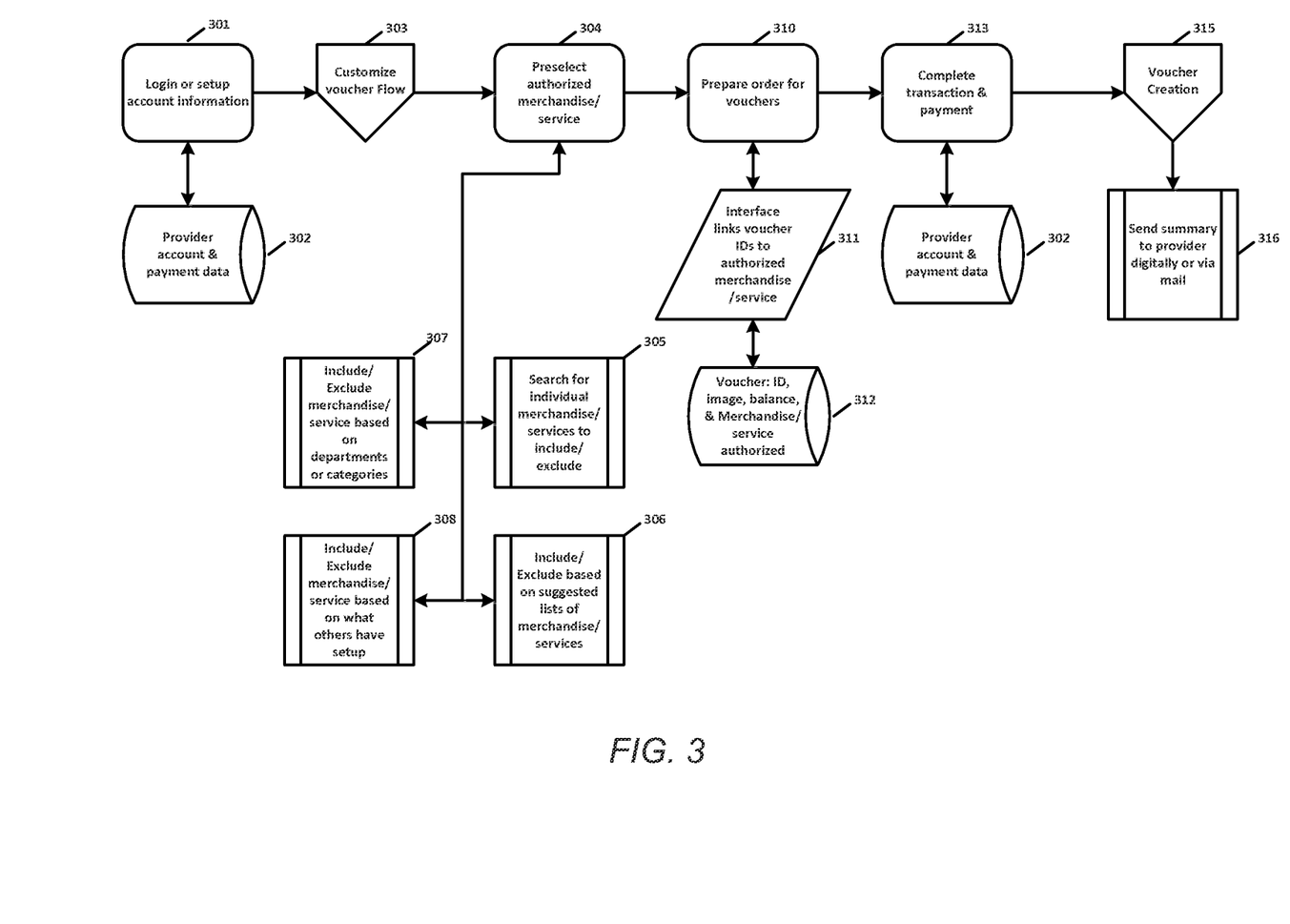
FIG. 3 is a flow diagram of a method for voucher setup in accordance with several embodiments.
Figure 4:
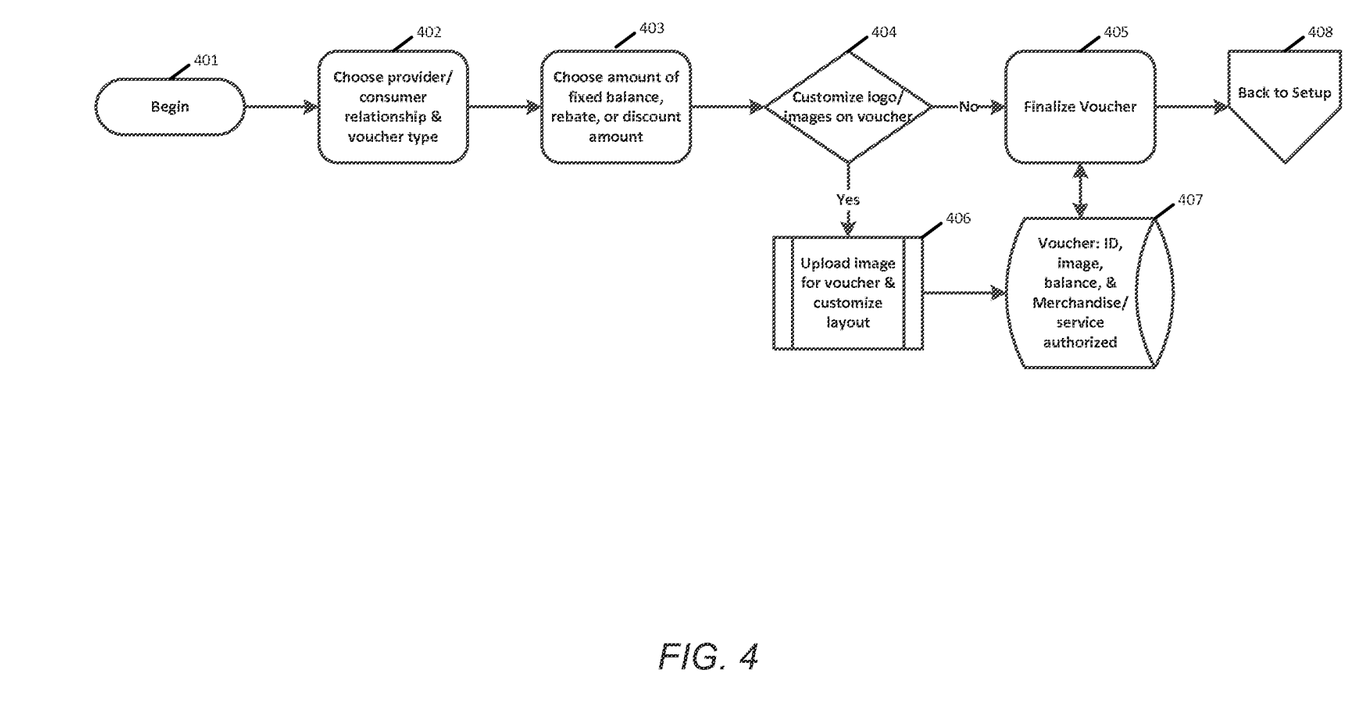
FIG. 4 is a flow diagram of a method for voucher customization in accordance with several embodiments.

Referring now to FIG. 3, a flow diagram of a method for voucher setup is shown. At step 301, a user logs into the system or setup account information. Step 301 user's login credentials may be stored in the provider account and payment data database 302. In step 303, a voucher is customized. An example process for customizing a voucher is shown in FIG. 4 and described in more detail below. In step 304, a user pre-selects authorized merchandise and/or service for the voucher. The pre-selection may include one or more of steps 305-308. In step 305, the user searches for individual merchandise or services to include or exclude. In step 306, the user includes or excludes items based on suggested lists of merchandise and/or services. In step 307, the user includes or excludes merchandise and/or services based on product departments and/or categories. In step 308, the user includes or excludes merchandise or services using lists others have setup.

In step 310, order for vouchers is prepared. In step 311, the user interface links voucher Ms to authorized merchandise/service information configured in step 304. The voucher ID, voucher image, voucher balance, and authorized merchandise service information may be stored and/or retrieved from a voucher information database 312.

Figure 5:
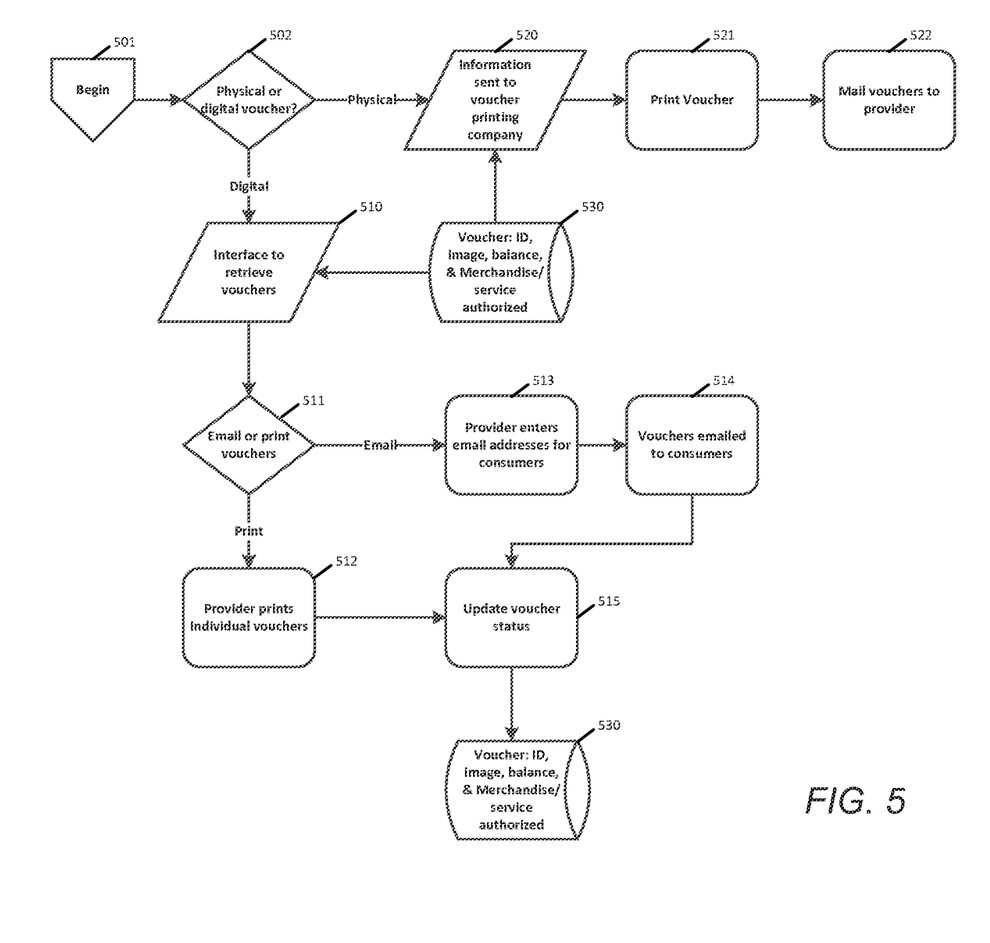
FIG. 5 is a flow diagram of a method for voucher creation in accordance with several embodiments.

In step 313, transaction and/or payment is completed. Provider account and payment data may be retrieved from the provider account and payment data database 302 at step 313 to process the payment. In some embodiments, provider payment data may be entered in step 313. In step 315, one or more vouchers are created. An example of a process for creating a voucher is shown in FIG. 5 and described in more detail below. In step 316, a created voucher summary is sent to a provider digitally or via mail.

Referring now to FIG. 4, a method of voucher customization is shown. The process begins at step 401. In step 402, a user chooses a provider/consumer relationship and voucher type. Voucher types may include gift cards, percentage discount coupons, monetary amount discount coupons, rebate coupons, loyalty programs, etc. Based on the voucher type selected, the user may also choose to pre-pay for the amount of the voucher or be billed after vouchers are redeemed. In step 403, the user chooses an amount of fixed balance, rebate, or discount amount for the voucher type. In step 404, the user can choose to customize a logo and/or image on the voucher. If the user chooses not to customize logo and image in step 404, the voucher is finalized in step 405. Otherwise, at step 406, the user can uploads images for the voucher and customize voucher layout. The result of the customization can be stored in the voucher information database 407. At 405, voucher information database 407 may provide information such as voucher ID, image, balance, and authorized merchandise and/or service to finalize the voucher. At step 408, the process returns to voucher setup for entering other configuration options for the voucher(s).

Referring now to FIG. 5, a method for voucher creation is shown. The process beings at step 501. In step 502, the user selects between a physical voucher and a digital voucher to generate.

If physical voucher is selected, the process proceeds to step 520, and voucher information is sent to a voucher printing company. Information needed to print the voucher may be retrieved from a voucher information database 530 storing voucher ID, voucher image, voucher balance, and authorized merchandise and service etc. In step 521, one or more vouchers are printed. For example, the printing company may print a voucher for each voucher identifier generated in a session using voucher customization settings stored in the voucher information database 530. In step 522, vouchers are mailed to the provider for distribution.

If digital voucher is selected in step 502, an interface to retrieve vouchers is provided in step 310. The interface may retrieve and display voucher information from the voucher information database 530. In step 511, the user selects whether the voucher should be emailed or printed. If the voucher is to be printed, in step 512, the provider prints individual vouchers. If the voucher is to be emailed, in step 513, the provider enters email addresses for the consumers. In step 514, the system emails vouchers the consumers. After either step 514 or 512, in step 515, voucher status is updated. In step 515, the voucher information database 330 may be update to reflect user selections and data entered steps shown in FIG. 5. The voucher information database 530 may also be updated to indicate whether and how a voucher was distributed (e.g. digital, physical, email, print etc.). In some embodiments, once a voucher is generated, the system would not allow another voucher with the same identifier to be generated again.

Figure 6:
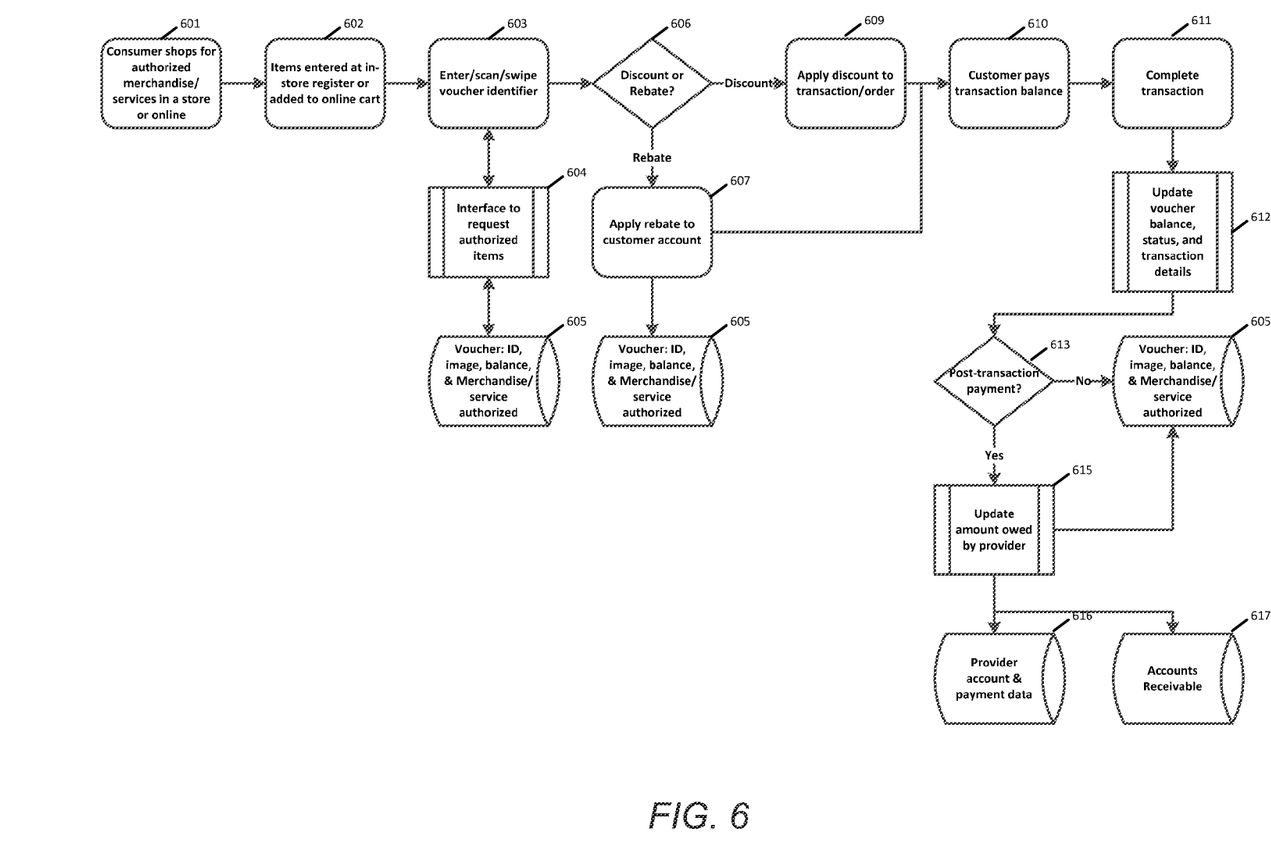
FIG. 6 is a flow diagram of a method for voucher usage in accordance with several embodiments.

Referring now to FIG. 6, a method for voucher usage is shown. In step 601, a consumer shops for authorized merchandise and/or services in a store or online. In step 602, items are entered at an in-store register or added to an online cart. In step 603, voucher identifier is entered, scanned, or swiped. In step 604 the interface requests authorized items information. Authorized items associated with the voucher entered in step 603 may be retrieved from a voucher information database 605.

In step 606, the system determines whether the voucher is a discount voucher or a rebate voucher. If the voucher is a rebate voucher, in step 607, rebate is applied to the customer's account. The rebate applied may be based on information stored in the voucher information database 605. If the voucher is a discount voucher, in step 609, discount is applied to the transaction and/or order to reduce the transaction balance.

After either step 609 or step 607, in step 610, customer pays for the transaction balance. In step 611, transaction is completed. In step 612, voucher balance, status, and/or transaction detail is updated.

In step 613, the system determines whether post-transaction payment is required. If not, updated voucher information is stored into the voucher information database 605. For example, for a pre-loaded gift card, post transaction payment may not be required, and the balance information for the gift card is updated in the voucher information database 605. If post transaction payment is required, in step 615, the amount owed by the provider is updated at a provider account and payment data database 616 and/or an accounts receivable database 617.

Figure 7:
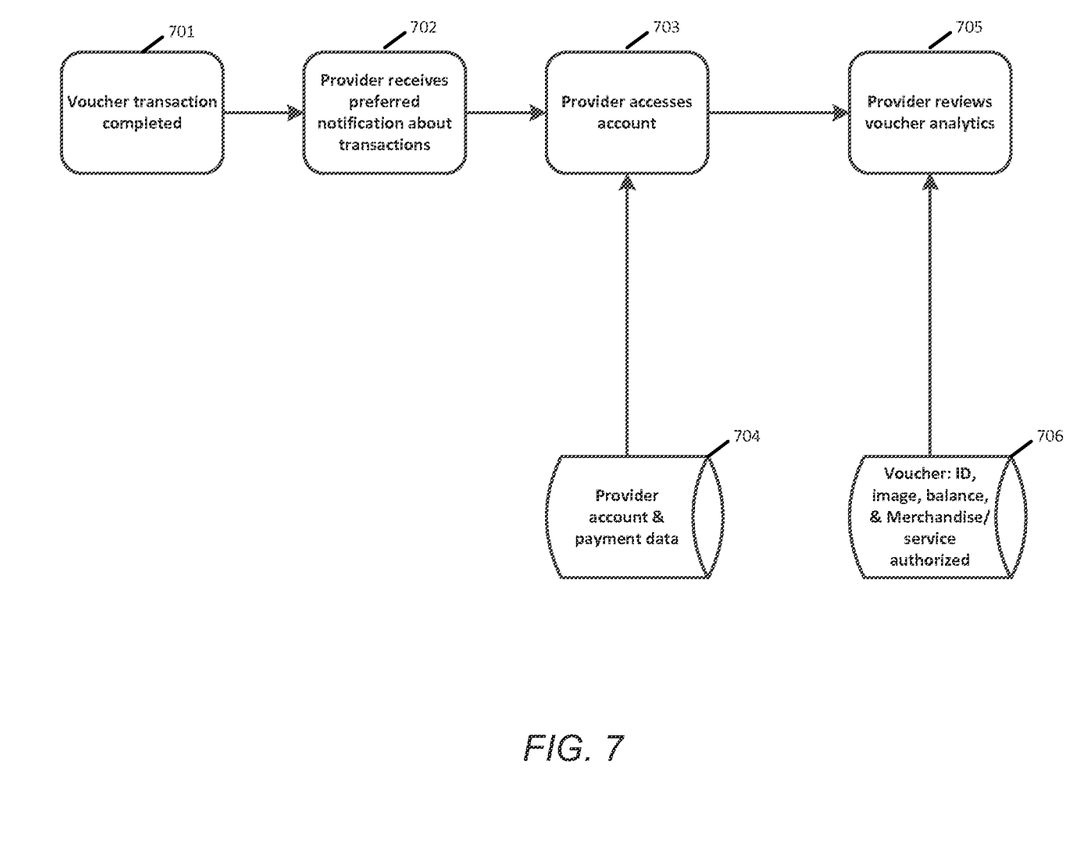
FIG. 7 is a flow diagram of a method post voucher usage in accordance with several embodiments.

Referring now to FIG. 7, a post voucher usage method is shown. In step 701, voucher transaction is completed. In step 702, the provider receives a preferred notification about the voucher transaction. In step 703, the provider accesses the provider account. The provider account information in step 703 may be retrieved from a provider account and payment data database 704. In step 705, the provider reviews voucher analytics, including data on voucher usage. The voucher analytics provided in step 705 may be generated based on information stored in a voucher information database 706.

The processes shown in FIG. 3-7 are provided as examples only. One of more steps may be omitted or added without departing from the spirit of the present disclosure.

Figure 8:
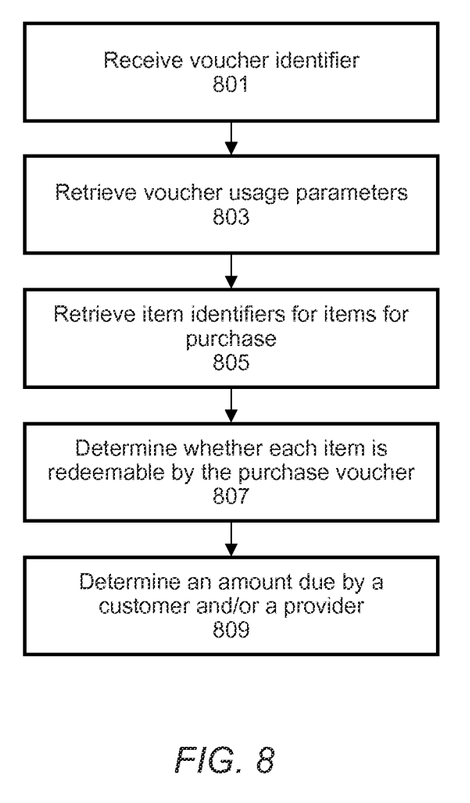
FIG. 8 is a flow diagram of a method for purchase voucher redemption in accordance with several embodiments.

Referring now to FIG. 8, a method for redeeming a voucher is shown. In step 801, a voucher identifier is received at a point of sale. The point of sale may be an in-store checkout terminal or an online store. In step 803, usage parameters associated with the received voucher identifier is retrieved. In step 805, item identifier for items for purchase is received. Items for purchase may be items a consumer brought to the checkout counter or items in a virtual shopping cart. In step 807, the system determines whether each item for purchase is redeemable by the purchase voucher. Step 807 may be based on item inclusion or exclusion rules in the usage parameters. In step 807, an amount due by the customer and/or a provider is determined. For example, if customer brings items A and B to a checkout terminal and redeems a voucher authorizes only for the purchase of items A, the customer would be responsible for the full cost of item B and any portion of the cost of item A not covered by the voucher. One or more of steps 801-809 may be performed by an internal system at the point of sale or on a remote server.

In some embodiments, systems, apparatuses and methods are provided herein for creating purchase voucher. In one embodiment, a method of creating a purchase voucher is provided. The method includes the steps of: providing a network accessible user interface for configuring the purchase voucher, receiving a selection of a voucher type through the user interface, receiving a selection of one or more products through the user interface, generating voucher usage parameters based on at least the selection of the voucher type and the selection of the one or more products, associating the voucher usage parameters with a voucher identifier, the voucher identifier being configured to be used by a customer to redeem the purchase voucher with a retailer, and storing the voucher usage parameters and the associated voucher identifier at a networked database.

In one embodiment, an apparatus for configuring a purchase voucher is provided. The apparatus includes a processor-based device and a non-transitory computer readable medium storing a set of instructions executable by the processor-based device. The set of instructions is configured to cause the processor based device to perform the steps of: providing a network accessible user interface for configuring the purchase voucher, receiving a selection of a voucher type through the user interface, receiving a selection of one or more products through the user interface, generating voucher usage parameters based on at least the selection of the voucher type and the selection of one or more products, associating the voucher usage parameters with a voucher identifier, the voucher identifier being configured to be used by a customer to redeem the purchase voucher with a retailer, and storing the voucher usage parameters and the associated voucher identifier at a networked database.

In one embodiment, a method of redeeming a purchase voucher is provided. The method includes the steps of: receiving a voucher identifier, retrieving voucher usage parameters associated with the voucher identifier, receiving item identifiers for one or more items for purchase, determining whether each of the one or more items for purchase is redeemable by the purchase voucher associated with the voucher identifier based on the voucher usage parameters, and determining at least one of an amount due by a customer and an amount due by a voucher provider based on items redeemable by the purchase voucher and a voucher type indicated in the usage parameters.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of creating a purchase voucher comprising:
   transmitting by a server to a user device, a network accessible user interface for configuring the purchase voucher through an application executed on the user device;
   receiving a selection of a voucher type from a user through a user interface of the user device executing the application;
   receiving by the server a selection of one or more products through the user interface of the user device executing the application;
   generating, by the server, voucher usage parameters based on at least the selection of the voucher type and attributes of the one or more products selected, wherein the voucher parameters specify products that are included or excluded from purchases made with a purchase voucher;
   associating, by the server and in a networked database, the voucher usage parameters with a plurality of voucher identifiers distributed to multiple customers, each voucher identifier being configured to be used by a different customer to redeem a purchase voucher with a retailer;
   associating, by the server, a billing account of a provider with the plurality of voucher identifiers;
   receiving, from a point of sale system, a purchase request comprising a voucher identifier among the plurality of voucher identifiers and a plurality of items scanned by a scanner of the point of sale system;
   determining, by the server, an amount due by the provider associated with the voucher identifier based on voucher usage parameters associated with the voucher identifier and the plurality of scanned items; and
   charging, by the server, the billing account of the provider associated with the plurality of voucher identifiers for the amount due by the provider upon a completion of a purchase associated with the purchase request at the point of sale system.

2. The method of claim 1, further comprising:
   providing a plurality of voucher types for selection, the plurality of voucher types comprising one or more of a gift card, a percentage discount coupon, a monetary amount discount coupon, and a rebate coupon.

3. The method of claim 1, further comprising:
   providing a plurality of product groups, sub-groups, and individual products for selection.

4. The method of claim 3, wherein the products groups and the sub-groups each comprises one or more individual products grouped based on at least one of product category, product type, manufacturer, nutritional value, maturity rating, price, and a user defined product group.

5. The method of claim 1, wherein the voucher usage parameters define one or more products to include or exclude from products redeemable with the purchase voucher according to the selection of the one or more products.

6. The method of claim 1, further comprising: electronically transmitting the voucher identifier to the customer.

7. The method of claim 1, wherein the voucher identifier is configured to be used to generate a physical redemption voucher.

8. The method of claim 1, further comprising: providing voucher appearance configuration options through the user interface.

9. The method of claim 1, further comprising: receiving provider payment information and associating the provider payment information to the voucher identifier.

10. An apparatus for configuring a purchase voucher comprising:
    a processor-based device of a server; and
    a non-transitory computer readable medium storing a set of instructions executable by the processor-based device and configured to cause the processor-based device to perform the steps of:
       transmitting to a user device a network accessible user interface for configuring the purchase voucher through an application executed on the user device;
       receiving a selection of a voucher type from a provider through the user interface of the user device executing the application;
       receiving a selection of one or more products through the user interface of the user device executing the application;
       generating, by a server, voucher usage parameters based on at least the selection of the voucher type and attributes of one or more products selected, wherein the voucher parameters specify products that are included or excluded from purchases made with a purchase voucher;
       associating, in a networked database, the voucher usage parameters with a plurality of voucher identifiers distributed to multiple customers, each voucher identifier being configured to be used by a different customer to redeem a purchase voucher with a retailer;
       associating a billing account of the provider with the plurality of voucher identifiers;
       receiving, from a point of sale system, a purchase request comprising a voucher identifier among the plurality of voucher identifiers and a plurality of items scanned by a scanner of the point of sale system;
       determining an amount due by the provider associated with the voucher identifier based on voucher usage parameters associated with the voucher identifier and the plurality of scanned items; and
       charging the billing account of the provider associated with the plurality of voucher identifiers for the amount due by the provider upon a completion of a purchase associated with the purchase request at the point of sale system.

11. The apparatus of claim 10, wherein the processor-based device further performs the step of: providing a plurality of voucher types for selection, the plurality of voucher types comprising one or more of a gift card, a percentage discount coupon, a monetary amount discount coupon, and a rebate coupon.

12. The apparatus of claim 10, wherein the processor-based device further performs the step of: providing a plurality of product groups, sub-groups, and individual products for selection.

13. The apparatus of claim 12, wherein the product groups and the sub-groups each comprises one or more individual products grouped based on at least one of category, manufacturer, nutritional value, maturity rating, and price.

14. The apparatus of claim 10, wherein the voucher usage parameters define one or more products to include or exclude from products redeemable with the purchase voucher according to the selection of the one or more products.

15. The apparatus of claim 10, wherein the processor-based device further performs the step of: electronically transmitting the voucher identifier to the customer.

16. The apparatus of claim 10, wherein the voucher identifier is configured to be used to generate a physical redemption voucher.

17. The apparatus of claim 10, wherein the processor-based device further performs the step of: providing voucher appearance configuration options through the user interface.

18. The apparatus of claim 10, wherein the processor-based device further performs the step of: receiving provider payment information and associating the provider payment information to the voucher identifier.

* * * * *